(12) United States Patent
Dai et al.

(10) Patent No.: US 10,860,441 B2
(45) Date of Patent: Dec. 8, 2020

(54) METHOD AND SYSTEM FOR DATA BACKUP AND RESTORATION IN CLUSTER SYSTEM

(71) Applicant: EMC IP Holding Company LLC, Hopkinton, MA (US)

(72) Inventors: Eddie Wenhao Dai, Chengdu (CN); Gluth Xuedong Gao, Shanghai (CN); Samuel Bo Li, Chengdu (CN); Zhongyi Zhou, Chengdu (CN); Beryl Xueqing Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 15/954,705

(22) Filed: Apr. 17, 2018

(65) Prior Publication Data

US 2018/0300206 A1    Oct. 18, 2018

(30) Foreign Application Priority Data

Apr. 17, 2017  (CN) .......................... 2017 1 0250421

(51) Int. Cl.
*G06F 16/00*   (2019.01)
*G06F 11/14*   (2006.01)
*G06N 5/02*    (2006.01)
*G06F 11/34*   (2006.01)

(52) U.S. Cl.
CPC ...... *G06F 11/1469* (2013.01); *G06F 11/1456* (2013.01); *G06F 11/1458* (2013.01); *G06N 5/02* (2013.01); *G06F 11/1438* (2013.01); *G06F 11/1464* (2013.01); *G06F 11/3433* (2013.01); *G06F 11/3452* (2013.01); *G06F 2201/84* (2013.01)

(58) Field of Classification Search
CPC ............. G06F 11/1469; G06F 11/1456; G06F 11/1458; G06F 11/1438; G06F 11/1464; G06F 11/3433; G06F 11/3452; G06F 2201/84; G06N 5/02
USPC ........................................................ 707/649
See application file for complete search history.

(56) References Cited

U.S. PATENT DOCUMENTS

| | | | |
|---|---|---|---|
| 8,566,549 B1 * | 10/2013 | Burke | G06F 3/0611 711/114 |
| 8,880,801 B1 * | 11/2014 | Robins | G06F 12/0246 711/114 |
| 9,201,887 B1 * | 12/2015 | Earl | G06F 16/128 |
| 10,146,634 B1 | 12/2018 | Bishop et al. | |
| 10,289,441 B1 | 5/2019 | Chopra et al. | |
| 10,331,525 B2 | 6/2019 | Earl et al. | |
| 10,417,027 B1 | 9/2019 | Earl et al. | |
| 10,614,047 B1 | 4/2020 | Acharya et al. | |

(Continued)

*Primary Examiner* — Monica M Pyo
(74) *Attorney, Agent, or Firm* — BainwoodHuang

(57) ABSTRACT

Embodiments of the present disclosure provide a method, a system and a computer readable storage medium for data backup and restoration in a cluster system. The method comprises obtaining performance data of the nodes, the performance data being collected periodically by the backup and restore proxy modules; predicting workloads of the nodes based on the performance data; selecting, based on the predicted workloads, a backup node from the nodes, to take over a data backup and restore task from a working node which is currently in charge of the data backup and restore task.

12 Claims, 8 Drawing Sheets

(56) References Cited

U.S. PATENT DOCUMENTS

| | | | |
|---|---|---|---|
| 2009/0320029 A1* | 12/2009 | Kottomtharayil | G06F 9/505 718/102 |
| 2010/0077160 A1* | 3/2010 | Liu | G06F 3/0482 711/162 |
| 2010/0251234 A1* | 9/2010 | Oshins | G06F 9/4856 718/1 |
| 2012/0324183 A1* | 12/2012 | Chiruvolu | G06F 11/2038 711/162 |
| 2016/0320825 A1* | 11/2016 | Panda | G06F 1/3206 |

* cited by examiner

METHOD AND SYSTEM FOR DATA BACKUP AND RESTORATION IN CLUSTER SYSTEM

RELATED APPLICATIONS

This application claim priority from Chinese Patent Application Number CN201710250421.3, filed on Apr. 17, 2017 at the State Intellectual Property Office, China, titled "METHOD AND SYSTEM FOR DATA BACKUP AND RESTORE IN CLUSTER SYSTEM" the contents of which is herein incorporated by reference in its entirety.

FIELD

The present disclosure relates to data management and protection in a cluster environment, and more specifically, to a method and system for data backup and restoration in a cluster environment having a shared storage system.

BACKGROUND

Cluster environment is an important scenario for a large-scale data center. Data backup and restoration is vital for ensuring information security of the cluster environment. Through data backup and restoration, historical data can be archived and data loss due to accidental incidents can also be prevented.

The conventional method for data backup and restoration in a cluster system generally depends on dedicated proxy nodes. As the quality of data backup and restoration of the whole cluster system relies totally on the performance of the dedicated proxy node, if the dedicated proxy node malfunctions, or with a low-level hardware configuration, the performance of the whole cluster system will be affected adversely.

SUMMARY

The present disclosure provides a method and system for data backup and restoration in a cluster system, which can improve fault tolerance of the cluster system so that data backup and restoration can be completed successfully even if nodes in the cluster system malfunction.

According to a first aspect of the present disclosure, there is provided a method for managing data backup and restoration in a cluster system in which each of nodes is configured with a backup and restore proxy module, the method comprising: obtaining performance data of nodes, the performance data being collected periodically by a backup and restoration proxy module; predicting workloads of the nodes based on the performance data; selecting, based on the predicted workloads, a backup node from the nodes to take over a data backup and restore task from a working node which is currently in charge of the data backup and restoration task.

According to a second aspect of the present disclosure, there is provided a system for managing data backup and restoration in a cluster system in which each of node is configured with a backup and restore proxy module, the system being manager nodes in the cluster system, and comprising: a memory configured to store one or more programs; and a processing unit coupled to the memory and configured to execute the one or more programs to cause the manager system to perform a plurality of acts, the acts comprising: obtaining performance data of nodes, the performance data being collected periodically by a backup and restoration proxy module; predicting workloads of the nodes based on the performance data, and selecting, based on the predicted workloads, a backup node from the nodes to take over a data backup and restore task from a working node which is currently in charge of the data backup and restore task.

According to a third aspect of the present disclosure, there is provided a proxy method for data backup and restoration at each of nodes in a cluster system, the nodes including a manager node, the proxy method comprising: obtaining performance data of the nodes periodically; unloading the performance data to the manager node; receiving a call for a backup node from the manager node, the backup node being used to take over a data backup and restore task; and in response to detecting a request for node switching, taking over, by the backup node, the data backup and restore task from a working node which currently in charge of the data backup and restore task.

According to a fourth aspect of the present disclosure, there is provided a proxy system for data backup and restore in a cluster system, each of nodes in the cluster system being configured with backup and restore proxy modules, the proxy system being proxy nodes in the cluster system, and comprising: a storage unit configured to store one or more programs; and a processor coupled to the storage unit and configured to execute the one or more programs to cause the proxy system to perform a plurality of acts, the acts comprising: obtaining performance data of the nodes periodically; unloading the performance data to the manager node; receiving a call for a backup node from the manager node, the backup node being used to take over a data backup and restore task; and in response to detecting a request for node switching, taking over, by the backup node, the data backup and restore task from the a working node which is currently in charge of the data backup and restore task.

According to a fifth aspect of the present disclosure, there is provided a computer readable storage medium having one or more computer programs stored thereon, the programs, when executed by a processor, implementing the method of data backup and restoration in a cluster system according to the first or the third aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent, wherein in the example embodiments of the present disclosure, the same reference symbols refer to the same elements.

Throughout the drawings, the same or corresponding reference symbols refer to the same or corresponding elements.

DETAILED DESCRIPTION OF EMBODIMENTS

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "a further embodiment" is to be read as "at least one further embodiment." The terms "first" and "second" and so on can represent different or identical objects. Other explicit and implicit definitions may be included in the following text.

Figure 1:
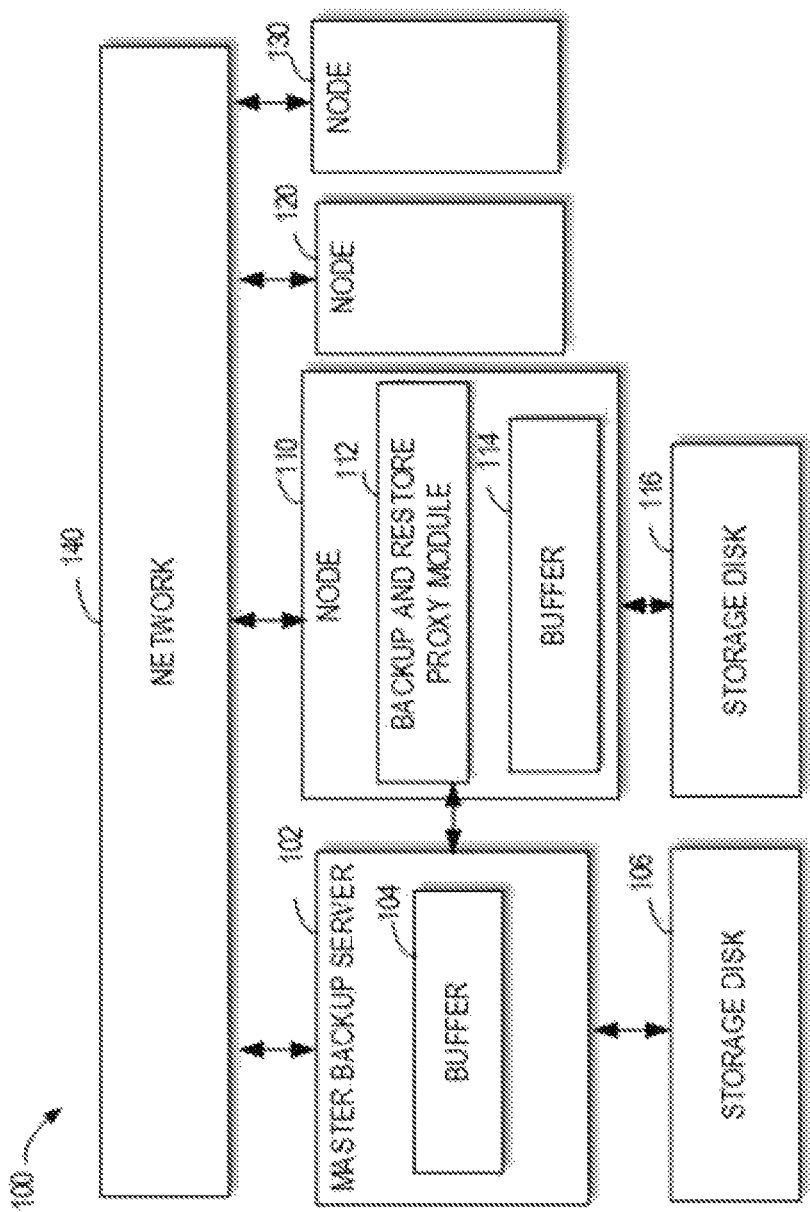
FIG. 1 is an architecture diagram illustrating a conventional cluster system 100.

As described above, the conventional method for data backup and restoration in a cluster system is generally based on a dedicated proxy node. For example, FIG. 1 illustrates an architecture diagram of a conventional cluster system 100. As shown in FIG. 1, the cluster system 100 comprises a master backup server 102 and a plurality of nodes, such as 110, 120 and 130. Besides, the cluster system 100 further comprises a network 140, storage disks 106 and 116 and so on. A proxy module 112 (such as a program) for data backup and restoration of each node in the cluster system 100 is only configured at a dedicated node 110 in the cluster system. Nodes 120 and 130 are clients which can be application server, database and file server. In the above method, the quality of data backup and restoration service of the whole cluster system 100 depends totally on the performance and operation state of the dedicated proxy node 110. If this dedicated node malfunctions, it would be impossible for the whole cluster system to perform data backup and restoration normally, which causes error tolerance of the whole cluster system to be low, namely, poor robustness. If this dedicated node has low-level hardware configuration or heavy workload, data backup and restoration service of the whole cluster system will break down, or the performance of data backup and restoration would be poor.

To solve the above problem and one or more of the other potential problems at least in part, example embodiments of the present disclosure provide a scheme of data backup and restoration in a cluster system. By configuring backup and restoration proxy module in each of nodes of the cluster system, the scheme enables all the nodes of the cluster system can be selected to take over the data backup and restore task. Besides, by configuring a manager node, the scheme enables the manager node to predict the workload of each node with, for instance (but not limited to), the exponential average algorithm (EMA) to intelligently select one node as a backup node for taking over the ongoing data backup and restore task. As the above scheme selects a proper or active node as the backup node based on the workload of each of nodes predicted by the manager node to take over the ongoing backup and restore task, once some working nodes malfunction or have heavy workload, the backup node selected by the manager node can take over the ongoing backup and restore task quickly, thereby improving error tolerance of the cluster system significantly, and facilitating dynamic load balance of the cluster system.

Figure 2:
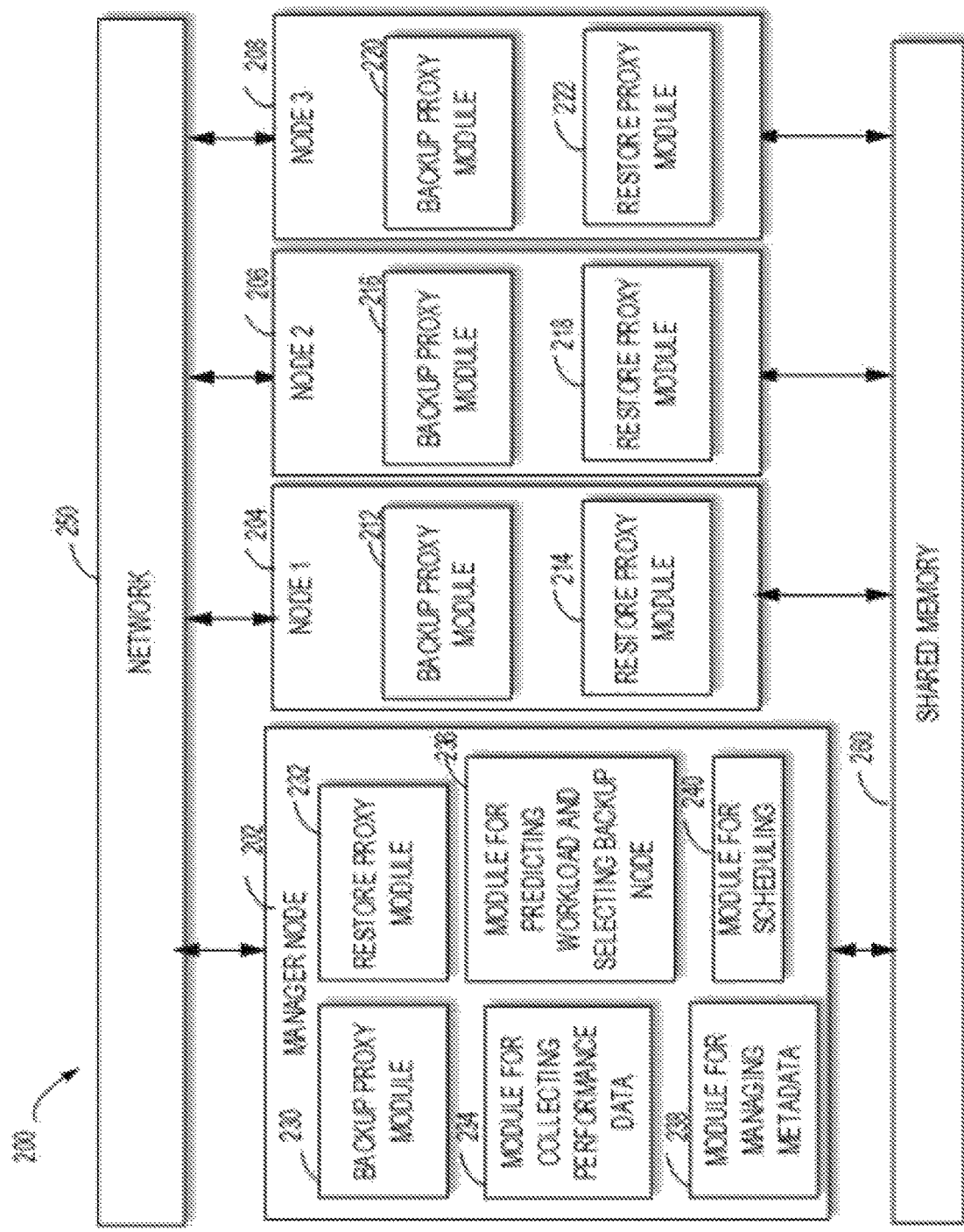
FIG. 2 is an architecture diagram illustrating a cluster system 200 according to the embodiments of the present disclosure.

FIG. 2 is an architecture diagram illustrating a cluster system 200 according to the embodiments of the present disclosure. It shall be appreciated that the structure and function of the system 200 shown in FIG. 2 are only for illustrative purposes, rather than to suggest any limit to the scope of the present disclosure. Embodiments of the present disclosure can be embodied in different structures and/or functions.

As shown in FIG. 2, the cluster system 200, for example, is a parallel or distributed system formed by a plurality of nodes interconnected via network, each of nodes forming a unit of the cluster system 200, the nodes comprising a manager node 202 and nodes 1 to N. In FIG. 2, node 1 is illustratively represented by 204; node 2 is represented by 206, and node N is represented by 208. In some embodiments, nodes 1 to N may contain local nodes and remote nodes.

In some embodiments, the cluster system 200 enables data sharing, for example, through a shared memory, in the manner of sharing a magnetic disk structure, for instance, or by sharing the memory structure. In some embodiments, nodes of the cluster system 200 can be connected to a shared memory via an I/O bus. Apart from data, the shared magnetic disk can also store checkpoint files or key system mirror images for restoration in case of node malfunction, thereby improving availability of the cluster. Furthermore, as data on the magnetic disk are shared, consistency can be maintained, and data switch between nodes can be avoided.

As illustrated in FIG. 2, each of nodes in the cluster system 200 is configured with a backup and restore proxy module for controlling the data backup and restoration executed at the respective node, for example, copying data to a storage medium. Moreover, the backup and restore proxy module is further used to manage backup data, for example, collect performance data of the respective node associated with data backup online. For example, at node 1, there is configured a backup proxy module 212 and a restore proxy module 214, at node 2, there is configured a backup proxy module 216 and a restoration proxy module 218; and at node N, there is configured a backup proxy module 220 and a restore proxy module 222. The backup and restore proxy modules can be dedicated processors or implemented by corresponding program instructions, for example, implemented by program instructions stored in a memory at each of nodes. Since all the node in the cluster system are configured with backup and restore proxy modules, all the nodes in the cluster system are capable of taking over the data backup and restoration task, thereby solving the problem of poor error tolerance in the conventional data backup and restoration scheme in which only dedicated nodes are used to take on the data backup and restoration task.

For nodes 1 to N, as they are configured with backup and restore proxy modules, nodes 1 to N can be uses as a client to be backed up or a backing up server in the cluster system 200. In other words, nodes 1 to N do not only contain data to be backed up but also can take over the data backup and restore task according to the instructions from the manager node, and copy data to a backup medium and store the data. In some embodiments, nodes 1 to N can have memory coupled thereto, such as a buffer which is used to store data temporarily in a dynamic random access memory (DRAM), for instance. In addition, nodes 1 to N can also be coupled with a shared memory 260 and write data stored temporarily in the buffer into the shared memory 260 at a proper time. The shared memory 260 can be any non-volatile storage medium currently known or to be developed in the future, such as a magnetic disk, a solid state disk (SSD) or a magnetic disk array.

The manager node 202 serves as a master backup server in a cluster system 200 for arranging backup and restore operation. In some embodiments, the manager node 202 is further used to maintain the storage medium for storing data. The storage node 202 is further configured with a backup proxy module 230 and a restore proxy module 232, where the backup proxy module 230 at manager node is used to schedule the backup and restore proxy modules on nodes 1 to N so as to control the data backup task; the restore proxy module 232 at manager node is used to schedule backup and restoration proxy modules on nodes 1 to N so as to control the data restore task. Besides, the manager node 202 is further configured with a module 234 for collecting performance data, a module 236 for predicting workload and selecting backup node, a module 238 for managing metadata and a module 240 for scheduling.

The module 234 is used to obtain performance data of nodes 1 to N periodically with the backup and restore proxy modules at nodes 1 to N. In other words, after collecting performance data of the nodes periodically, the backup and restore proxy modules at each of nodes 1 to N unload the performance data to the module 234 for collecting performance data at the manager node 202. In some embodiments, the module 234 for collecting performance data more preferably obtains performance data of each local node. This is based on the consideration that the purpose of obtaining performance data of the nodes is to predict the workload of each of nodes based on the obtained performance data, so as to select the optimal backup node to take over the ongoing data backup and restore task at a proper time. When the remote nodes implement the data backup and restore task, their performance might be influenced by, for instance, network bandwidth. Therefore, for instance, when the cluster system 200 has a large-scale failure of working nodes, local nodes will be selected with higher priority to take over the data backup and restore task, while remote nodes will be selected with lower priority to take over the data backup and restore task. Based on these considerations, the module 234 for collecting performance data more preferably obtains performance data of each local node.

The module 236 for predicting workload and selecting backup node is used to predict the workload of each of nodes based on the performance data collected by the module 234 for collecting performance data, and select a backup node from the nodes to take over the data backup and restore task from the working nodes which is currently in charge of the data backup and restore task. In some embodiments, the module 236 for predicting workload and selecting backup node predicts the workload of each of nodes with, for instance (but not limited to), an exponential average algorithm (EMA). Employing the exponential average algorithm (EMA) to predict the load and select the backup node is mainly based on the consideration of the particularity of the application scenario for workload prediction. It is found that the workload condition at the time which is closer to the node switching time has greater reference value for determining whether the node is suitable for acting as a backup node, and conversely, the workload condition at the time which is farther from the node switching time has smaller influence on decision-making. Furthermore, the feature of the exponential average algorithm (EMA) is: the weighting of its observation values decreases exponentially with time. In other words, the closer the time period is to the current moment, the greater its observation value weight will be. The above feature of exponential average algorithm (EMA) makes it easy to reflect the observation value of the recent workload of each of nodes accurately, and thus have greater reference value for predicting the workload accurately, hence being suitable for solving the problem of predicting the workload of each of nodes accurately. Besides the exponential average algorithm (EMA), the module 236 for predicting workload and selecting backup node can also employ other algorithms for workload prediction.

The module 238 for managing metadata is used to enable the system to acquire how much data have been backed up and restored and how much data is to be backed up and restored. In some embodiments, the module 238 for managing metadata creates checkpoints periodically to record information about data that has been backed up and restored and information about data that are to be backed up and restored; when the working nodes is required to be switch, for example, some working nodes break downs, have too heavy loads or reach the moment for backup preset by the user, the cluster system 200 would generate a node switching request or instruction. The module 238 for managing metadata, responsive to detecting the request for node switching, reads the latest created checkpoints and further obtains information about data that has been backed up and restored currently, and information about data that is to be backed up and restored, so as to inform the system about how much data has been backed up/restored and how much data is to be backed up/restored, namely, learn the approximate the position where the ongoing data backup and restore operation stops.

The module 240 for scheduling is used to call the backup node in response to the result of backup node selection. In some embodiments, when the module 236 for predicting workload and selecting backup node selects the backup node to take over the data backup and restore task, in response to the selection of the backup node, the scheduler module 240 calls the backup node to wake it up. In some embodiments, if the backup node is not waken up, the module 240 for scheduling re-selects a next backup node with, for instance, the module 236 for predicting workload and selecting backup node.

Figure 3:
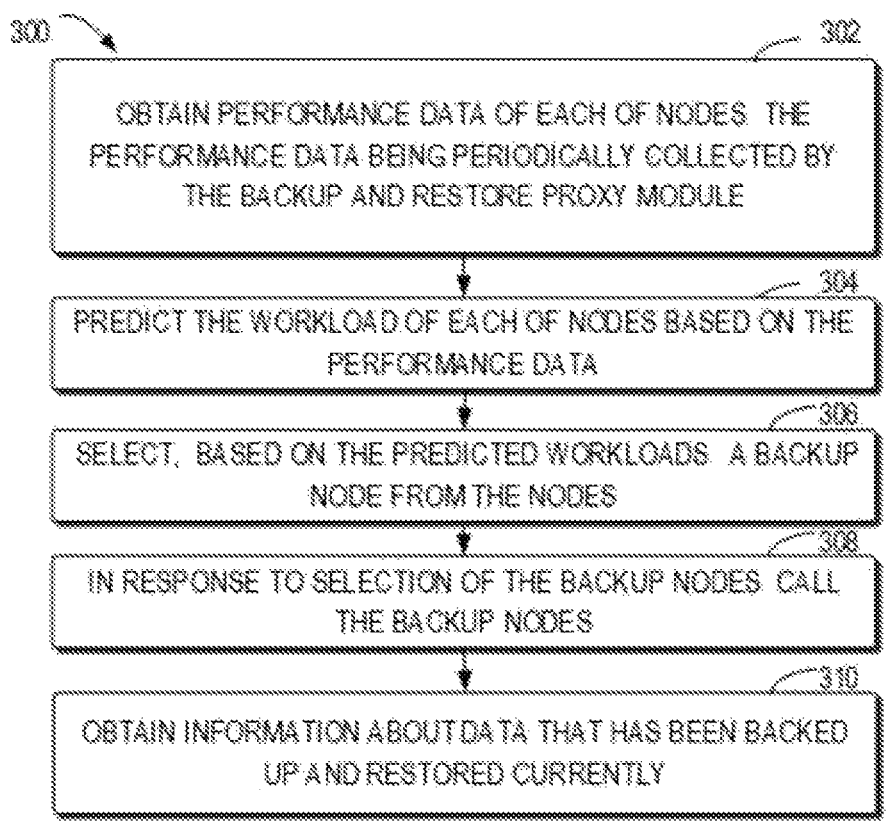
FIG. 3 is a flowchart illustrating a method 300 for data backup and restoration at a manager node in a cluster system according to the embodiments of the present disclosure.

FIG. 3 is a flowchart illustrating a method 300 for data backup and restoration at a manager node in a cluster system according to the embodiments of the present disclosure. The operations or actions involved in method 300 will be described below with reference to the cluster system 200 shown in FIG. 2. To facilitate this discussion, method 300 will be described in general, with the manager node 202 and nodes 1-N shown in FIG. 2 as examples. In FIG. 3, each action is performed by the manager node 202, for instance. Method 300 may also comprise additional actions not shown and/or the shown actions may be omitted. The scope of the present disclosure is not limited in this respect.

At block 302, the manager node 202 obtains performance data of the nodes collected periodically by the backup and restoration proxy module. In some embodiments, the manager nod 202 may obtain performance data of each of nodes periodically, such as every 15 minutes, and transmit the performance data periodically to the workload prediction and backup node selecting module 236. In some embodiments, the performance data mainly relate to resource usage associated with the data backup and restoration operation in each of nodes, for instance, comprising (but not limited to) data associated with one or more of the following: usage of processing unit, the usage of memories and I/O condition at the node. For example, performance data obtained from node 1 comprise: usage of the processing unit at node 1, such as $Y_{tcpu1}$, I/O condition, such as $Y_{tio1}$ usage of memories, such as $Y_{tmem1}$; performance data obtained from node N comprise: usage of processing unit at node N, such as $Y_{tcpuN}$, I/O condition, such as $Y_{tioN}$, and usage of memories, for such as $Y_{tmemN}$.

At block 304, the manager node 202 predicts the workload of the node based on the performance data. In some embodiments, the manager node 202 predicts the workload of the node with exponential average algorithm (EMA). The exponential average algorithm (EMA) is an exponential decrementing weighted moving average algorithm, and implemented using a recursive algorithm on a computer, for instance. The algorithm is, for instance:

$$S_t = \alpha \times Y_t + (1-\alpha) \times S_{t-1}$$

wherein α represents a smooth coefficient, or called as weighting factor. The smooth coefficient α, being a constant between 0 and 1, represents the degree of weighting decrease. Smooth coefficient α with higher value generally means deducting the previous observation value more quickly; $Y_t$ represents performance data at time period t; $S_t$ represents the exponential average index value (abbreviated as EMA value below) at time period t. Take the calculation of EMA value of usage of the processing unit as an example. For instance, the value of the smooth coefficient is $\alpha=2/(t+1)$, where t represents a period. If the period is 10, the value of the smooth coefficient α is 2/11, then EMA value of the usage of processing unit of the current period t can be calculated with 2/11 multiplied by the usage of processing unit $Y_{tcpu}$ of the current period t; and further with 9/11 multiplied by EMA value of the previous period (t−1); and then add the two results produced by above multiplication. As can be known from the algorithm equation mentioned above, the process of calculating EMA value of the usage of processing unit is actually of repetitive iterations, that is, to approximate a needed result. The EMA values obtained by each of iterations are used as the initial value of the next iteration. In some embodiments, by calculating EMA value of usage of processing unit $S_{tcpu}$ of the node, EMA value $S_{tio}$ of I/O condition, and EMA value $S_{tmem}$ of usage of memories; and then respectively multiplying the EMA value $S_{tcpu}$, EMA value $S_{tio}$ and EMA value $S_{tmem}$ of the same node, for instance, by their respective weight; and then adding the results produced by above multiplication; thus, a EMA value $S_t$ of the workload of the node can be obtained. Table 1 as below illustratively shows the EMA value $S_{t1}$, $S_{t2}$ or $S_{tN}$ of the workloads for nodes 1-N which are calculated respectively based on the value of $S_{tcpu}$, $S_{tio}$ and $S_{tmem}$ of the respective nodes. It is to be emphasized that these values or symbols are only illustrative, not intended to limit the scope of the present disclosure in any manner.

TABLE 1

| Node | Usage of processing unit | I/O condition | Usage of memories | EMA value |
|---|---|---|---|---|
| Node 1 | $S_{tcpu1}$ | $S_{tio1}$ | $S_{tmem1}$ | $S_{t1}$ |
| Node 2 | $S_{tcpu2}$ | $S_{tio2}$ | $S_{tmem2}$ | $S_{t2}$ |
| Node N | $S_{tcpuN}$ | $S_{tioN}$ | $S_{tmemN}$ | $S_{tN}$ |

At block 306, based on the predicted workloads, the manager node 202 selects from the nodes a backup node to take over the data backup and restoration task from a working node which is currently in charge of the data backup and restoration task. In some embodiments, the manager node 202 may select an idlest node in the next period as the backup node so as to take over the data backup and restoration task in response to receiving an instruction for node switching. In some embodiments, the manager node 202 may select a node with the optimal performance data as the backup node. As stated above, the manager node 202 preferably selects a node among local nodes as the backup node, and selects remote nodes that need to occupy network resources with lower priority. The local nodes mentioned herein are located locally with respect to nodes whose data is to be backed up and restored. That is to say, when the backup node take over the data backup and restoration task and perform actual data backup and restore, backup and restore speed will not be delayed due to the influence of the network bandwidth.

In some embodiments, the manager node 202 can also be equipped with a function of calling the selected node. For example, at block 308, when the workload prediction and backup node selecting module 236 selects the backup node for taking over the data backup and restoration task, the manager node 202 calls and wakes the backup node through the scheduler module 240.

Figure 4:
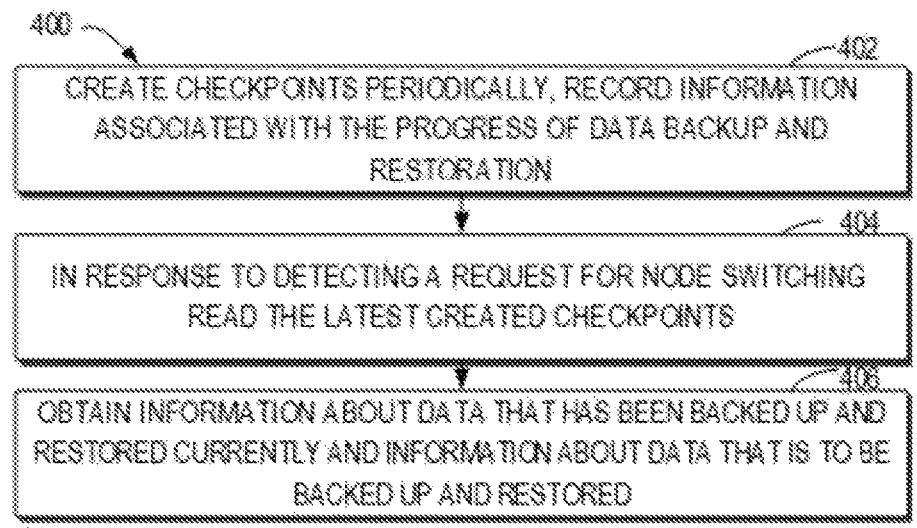
FIG. 4 is a flowchart illustrating a method 400 for acquiring a position where the ongoing backup and restore task stops according to the embodiments of the present disclosure.

In some embodiments, the manager node 202 may also be equipped with a function of learning a position where the ongoing backup and restoration task stops. For example, at block 310, the manager node 202 acquires information about data that have been backed up and restored and information about data that is to be backed up and restored. Block 310 will be described below with reference to operations and acts involved in method 400 as shown in FIG. 4. FIG. 4 is a flowchart illustrating a method 400 for acquiring a position where the ongoing backup and restoration task stops according to the embodiments of the present disclosure. As illustrated in FIG. 4, at block 402, the manager node 202 creates checkpoints periodically to record information about the process of data backup and restoration; at block 404, it is determined whether a request for node switching is detected. If the request for node switching is detected, in response to detecting the request for node switching, the latest created checkpoints are read; at block 406, information about data that have been backed up and restored currently and information about data that is to be backed up and restored are obtained.

Figure 5:
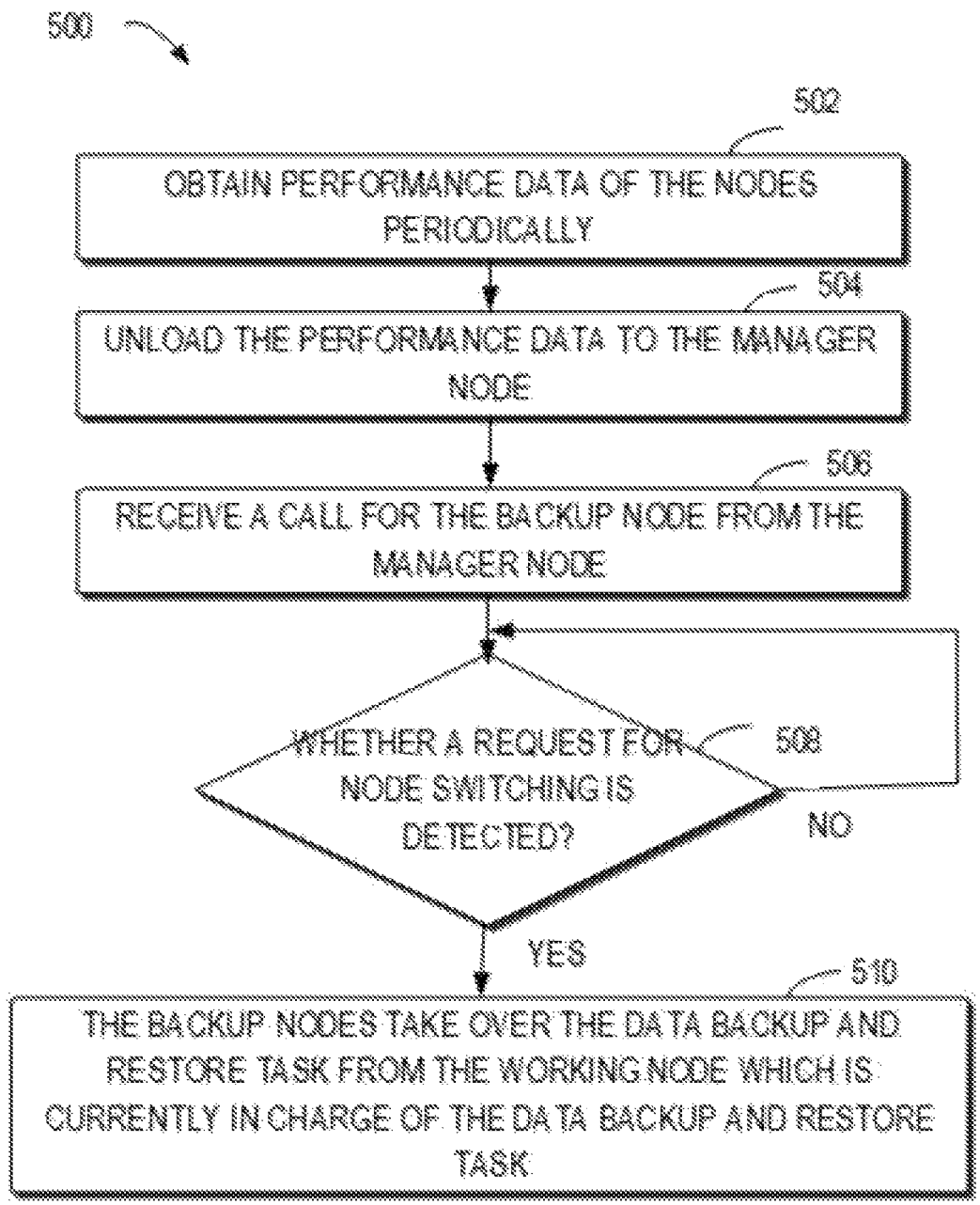
FIG. 5 is a flowchart illustrating a proxy method 500 for backup and restoration at each of nodes in a cluster system according to the embodiments of the present disclosure.

FIG. 5 is a flowchart illustrating a proxy method 500 for data backup and restoration of each of nodes in a cluster system according to the embodiments of the present disclosure. Acts involved in method 500 will be described with reference to the storage system 200 shown in FIG. 2. To facilitate this discussion, method 500 will be described in general, with the manager node 202 and nodes 1-N shown in FIG. 2 as examples. In FIG. 5, each act is performed at nodes 1-N, for instance. Method 500 may also comprise additional acts not shown and/or the shown acts may be omitted. The scope of the present disclosure is not limited in this respect.

At block 502, performance data of each node of nodes 1-N is acquired periodically. In some embodiments, data backup and restoration proxy modules configured at nodes 1-N collects the performance data of the respective node periodically, for instance, every 15 minutes, or in other proper time intervals, performance data of the respective node is collected. As described above, the performance data mainly relate to resource usage associated with the data backup and restore operation at the respective node, for instance, comprising (but not limited to) data associated with one or more of the following: usage of processing unit, usage of memories and I/O condition at the node.

At block 504, node 1-N unloads the performance data to the manager node. In some embodiments, node 1-N unloads the performance data to the performance data collecting module 234 of the manager node 202.

At block 506, in response to receiving a call for backup node from the manager node, the backup node is used to take over the data backup and restore task. In some embodiments, when the manager node 202 finishes selecting the backup node, the scheduler module of the manager node 202 transmits a signal to call the backup node. In some embodiments, if the current node is a selected backup node, it is waken after receiving a call from the manager node 202 to be ready for taking over the data backup and restoration task.

At blocks 508 and 510, in response to detecting a request for node switching, the backup node takes over the data backup and restoration task from the working node which is currently in charge of data backup and restoration task. In some embodiments, when current node which has been selected as a backup node detects a request for node switching, the backup node reads information about data that have been backed up and restored currently, and information about data that is to be backed up and restored, the information is obtained from the manager node 202; then takes over the data backup and restoration task at the position where the backup and restoration task stops from the working node which is currently in charge of the data backup and restoration task.

Figure 6:
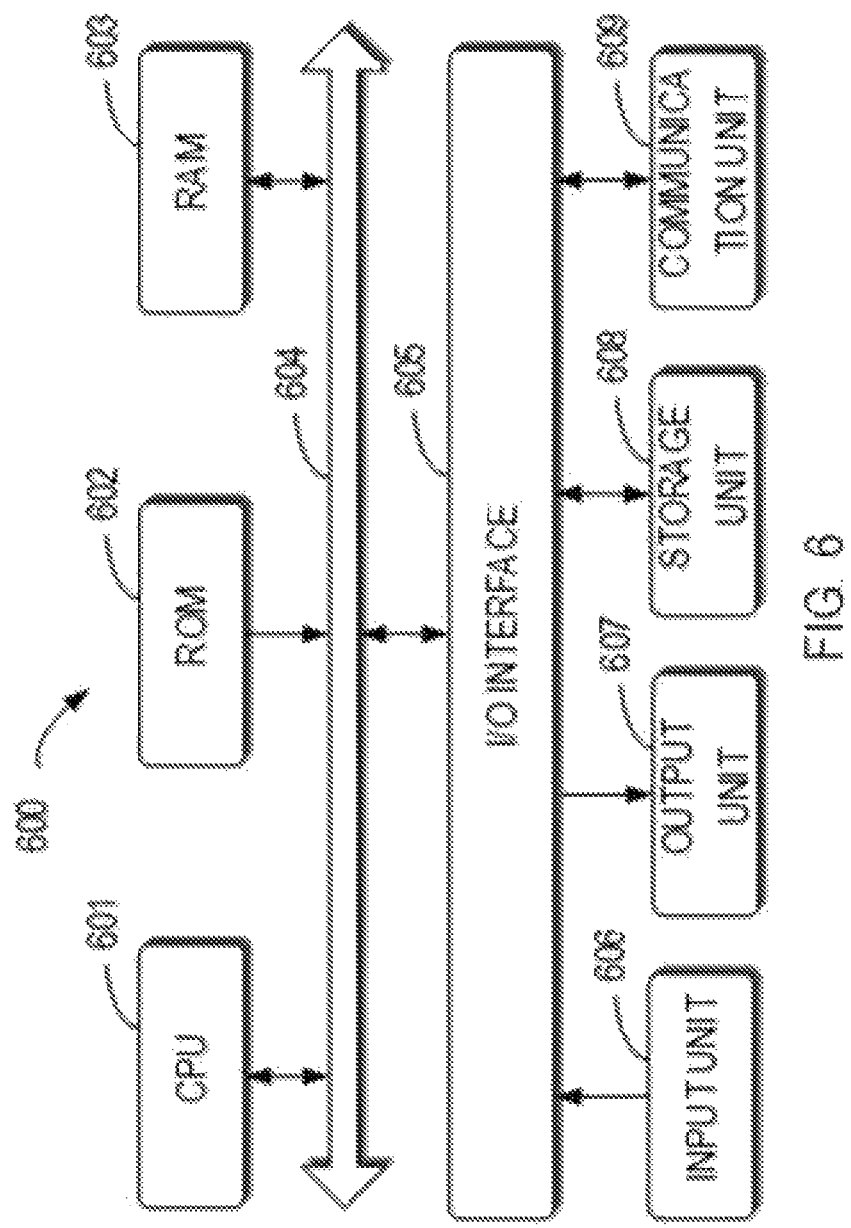
FIG. 6 schematically illustrates a block diagram of an electronic device 600 applicable to implement the embodiments of the present disclosure.

FIG. 6 schematically illustrates a block diagram of an electronic device 600 applicable to implement the embodiments of the present disclosure. The device 600 can be used to implement one or more hosts of the manager node or nodes 1-N shown in FIG. 2. As shown in the figure, the device 600 comprises a central processing unit (CPU) 601 which can execute various appropriate actions and processing based on the computer program instructions stored in a read-only memory (ROM) 602 or the computer program instructions loaded into a random access memory (RAM) 603 from a storage unit 608. The RAM 603 also stores all kinds of programs and data required by operating the storage device 600. CPU 601, ROM 602 and RAM 603 are connected to each other via a bus 604, to which an input/output (I/O) interface 605 is also connected.

A plurality of components in the device 600 are connected to the I/O interface 605, comprising: an input unit 606, such as keyboard, mouse and the like; an output unit 607, such as various types of display, loudspeakers and the like; a storage unit 608, such as magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing described above, such as method 300, 400 and 500 implemented for controlling data backup, can be executed by a processing unit 601. For example, in some embodiments, the method 300, 400 and 500 can be implemented as computer software programs, which are tangibly included in a machine-readable medium, such as storage unit 608. In some embodiments, the computer program can be partially or completely loaded and/or installed to the device 600 via ROM 602 and/or the communication unit 609. When the computer program is loaded to RAM 603 and executed by CPU 601, one or more steps of the above described method 300, 400 and 500 are implemented. Alternatively, CPU 601 can also be configured to execute the above described method 300, 400 and 500 in any suitable manner (such as by means of firmware).

Figure 7:
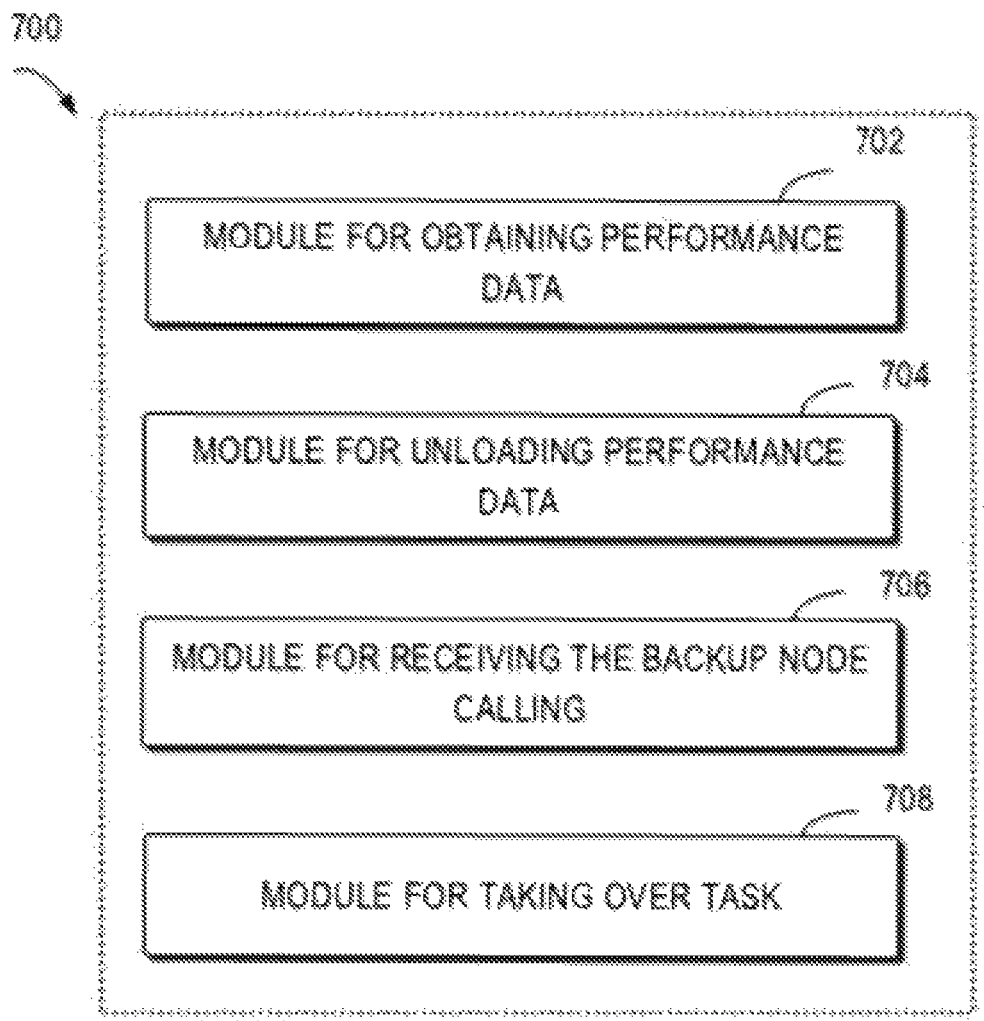
FIG. 7 schematically illustrates a block diagram of an apparatus 700 for controlling data backup according to an embodiment of the present disclosure.

FIG. 7 schematically illustrates a block diagram of an apparatus 700 for controlling data backup according to the embodiments of the present disclosure. In some embodiments, the apparatus 700 comprises a plurality of modules, each module corresponding to the block in method 500. In some embodiments, the apparatus may also be a computer program product stored on a computer storage medium and comprising computer executable instructions, the computer executable instructions, when executed in the device, causing the device to implement each block or act in method 500. As illustrated by FIG. 7, the apparatus 700 comprises: a module 702 for obtaining performance data of the node periodically; a module 704 for unloading the performance data to manager node; a module 706 for receiving a call for backup node from manager node, the backup node being used to take over the backup and restore task; a module 708 for the backup node taking over the data backup and restore task from the working node which is currently in charge of the data backup and restore task in response to detecting a request for node switching.

Figure 8:
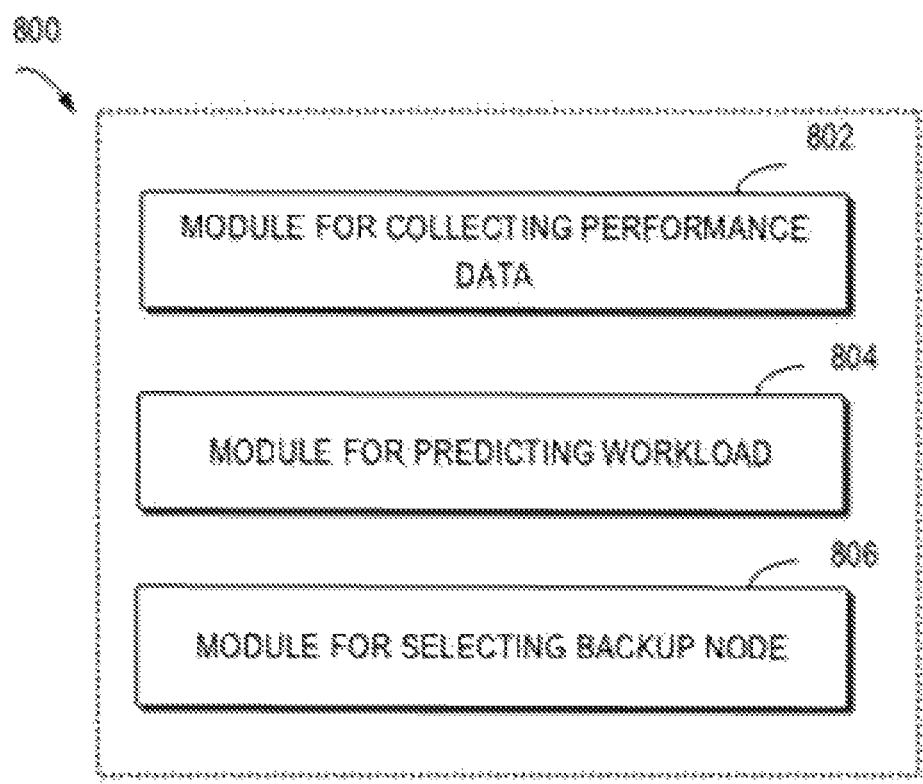
FIG. 8 schematically illustrates a block diagram of an apparatus 800 for controlling data backup according to an embodiment of the present disclosure.

FIG. 8 schematically illustrates a block diagram of an apparatus 800 for controlling data backup according to the embodiments of the present disclosure. In some embodiments, the apparatus 800 comprises a plurality of modules, each module corresponding to the block in method 300. In some embodiments, the apparatus may also be a computer program product stored on a computer storage medium and comprising computer executable instructions, the computer executable instructions, when executed in the device, causing the device to implement each block or act in method 300. As illustrated by FIG. 8, the apparatus 800 comprises: a module 802 for obtaining performance data of each node which is collected periodically by the backup and restore proxy module; a module 804 for predicting the workload of each of nodes based on the performance data; a module 806 for selecting, based on the predicted workloads, from nodes a backup node for taking over the data backup and restore task from the working node which is currently in charge of the data backup and restore task.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcode, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiment of the present disclosure has been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aim to best explain principle, actual application or technical improvement in the market of each embodiment or make each embodiment disclosed in the text comprehensible for those ordinary skilled in the art.

Those described above are only optional embodiments of the present disclosure, not intended to limit the present disclosure. For those skilled in the art, the present disclosure allows for various modifications and variations. Any amendment, equivalent arrangement or improvement that fall within the spirit and principle of the present disclosure shall be contained in the scope of protection of the present disclosure.

We claim:

1. A method of data backup and restoration at a manager processing node in a cluster system, the manager processing node being embodied as a computerized device, the method comprising:
   configuring a plurality of processing nodes in the cluster system with a plurality of backup and restore proxy processing modules, respectively, each of the plurality of processing nodes being embodied as a respective computerized device, the plurality of backup and restore proxy processing modules executing on the plurality of processing nodes, respectively;
   periodically collecting performance data of the plurality of processing nodes by the plurality of backup and restore proxy processing modules, respectively, the performance data including information about data that has been backed up and restored currently and information about data that is to be backed up and restored;
   predicting, by the manager processing node, workloads of the plurality of processing nodes based on the performance data collected by the plurality of backup and restore proxy processing modules, respectively, the plurality of processing nodes including a working node that is currently in charge of a data backup and restore task;
   selecting, by the manager processing node based on the predicted workloads, a backup node from among the plurality of processing nodes to take over the data backup and restore task from the working node,
   periodically creating, by the manager processing node, a checkpoint record for recording the information about the data that has been backed up and restored currently and the information about the data that is to be backed up and restored;
   in response to detecting a request for node switching between the working node and the backup node, reading the checkpoint record by the manager processing node; and
   obtaining, by the manager processing node, the information about the data that has been backed up and restored currently and the information about the data that is to be backed up and restored.

2. The method according to claim 1, wherein predicting workloads of the plurality of processing nodes comprises:
   predicting the workloads based on an exponential average algorithm (EMA).

3. The method according to claim 1, wherein the backup node is a local node with respect to a processing node whose data is backed up and restored.

4. The method according to claim 1, wherein obtaining the performance data comprises obtaining data associated with at least one of the following:
   usage of processing units of the respective processing nodes,
   usage of memories of the respective processing nodes, and
   I/O conditions of the respective processing nodes.

5. A system, comprising:
   a cluster system including a plurality of processing nodes, wherein each processing node from among the plurality of processing nodes in the cluster system is embodied as a respective computerized device and configured with a backup and restore proxy processing module executing on the processing node;
   wherein each respective processing node from among the plurality of processing nodes is configured to include computer-executable program logic encoded in memory of one or more computers for execution of:
   periodically collecting performance data of the respective processing node by the backup and restore proxy processing module configured within the respective processing node, the performance data including information about data that has been backed up and restored currently and information about data that is to be backed up and restored, and
   wherein at least a manager processing node from among the plurality of processing nodes is configured to include computer-executable program logic encoded in memory of one or more computers for the execution of:
   predicting a workload of each respective processing node from among the plurality of processing nodes based on the performance data collected by the backup and restore proxy processing module configured within the respective processing node, the plurality of processing nodes including a working node that is currently in charge of a data backup and restore task;
   selecting, based on the predicted workload of each of the plurality of processing nodes, a backup node from among the plurality of nodes to take over the data backup and restore task from the working node,
   periodically creating a checkpoint record for recording the information about the data that has been backed up and restored currently and the information about the data that is to be backed up and restored;
   in response to detecting a request for node switching between the working node and the backup node, reading the checkpoint record; and
   obtaining the information about the data that has been backed up and restored currently and the information about the data that is to be backed up and restored.

6. The system according to claim 5, wherein predicting workloads of the respective processing nodes comprises:
   predicting the workloads based on an exponential average algorithm (EMA).

7. The system according to claim 5, wherein the backup node is a local node with respect to a processing node whose data is backed up and restored.

8. The system according to claim 5, wherein obtaining the performance data comprises obtaining data associated with at least one of the following:
   usage of processing units of the respective processing nodes,
   usage of memories of the respective processing nodes, and
   I/O conditions of the respective processing nodes.

9. A computer program product for data backup and restoration at a manager processing node in a cluster system, the manager processing node being embodied as a computerized device, the computer program product comprising:
   a non-transitory computer readable medium encoded with computer-executable code, the code configured to enable the execution of:
   configuring a plurality of processing nodes in the cluster system with a plurality of backup and restore proxy processing modules, respectively, each of the plurality of processing nodes being embodied as a respective computerized device, the plurality of backup and restore proxy processing modules executing on the plurality of processing nodes, respectively;
   periodically collecting performance data of the plurality of processing nodes by the backup and restore proxy processing modules, respectively, the performance data including information about data that has been backed up and restored currently and information about data that is to be backed up and restored;

predicting, by the manager processing node, workloads of the plurality of processing nodes based on the performance data collected by the plurality of backup and restore proxy processing modules, respectively, the plurality of processing nodes including a working node that is currently in charge of a data backup and restore task;

selecting, by the manager processing node based on the predicted workloads, a backup node from among the plurality of processing nodes to take over the data backup and restore task from the working node, periodically creating, by the manager processing node, a checkpoint record for recording the information about the data that has been backed up and restored currently and the information about the data that is to be backed up and restored;

in response to detecting a request for node switching between the working node and the backup node, reading the checkpoint record by the manager processing node; and obtaining, by the manager processing node, the information about the data that has been backed up and restored currently and the information about the data that is to be backed up and restored.

10. The computer program product according to claim 9, wherein predicting workloads of the plurality of processing nodes comprises:

predicting the workloads based on an exponential average algorithm (EMA).

11. The computer program product according to claim 9, wherein the backup node is a local node with respect to a processing node whose data is backed up and restored.

12. The computer program product according to claim 9, wherein obtaining the performance data comprises obtaining data associated with at least one of the following:

usage of processing units of the respective processing nodes, usage of memories of the respective processing nodes, and I/O conditions of the respective processing nodes.

* * * * *